FIG. I

Sept. 12, 1972 J. G. SIBAKIN ET AL 3,690,867
ELECTRIC-ARC STEELMAKING
Filed Oct. 14, 1969 4 Sheets-Sheet 2

FIG. 2

INVENTORS
J. GEORGE SIBAKIN,
GORDON A. ROEDER &
BY PAUL H. H. HOOKINGS

Fay, Sharpe & Mulholland
ATTORNEYS

Sept. 12, 1972   J. G. SIBAKIN ET AL   3,690,867
ELECTRIC-ARC STEELMAKING
Filed Oct. 14, 1969   4 Sheets-Sheet 3

FIG. 3

INVENTORS
J. GEORGE SIBAKIN,
GORDON A. ROEDER &
PAUL H. H. HOOKINGS
BY
*Fay, Sharpe & Mulholland*
ATTORNEYS 3,690,867
ELECTRIC-ARC STEELMAKING
Jaroslaw George Sibakin, Ancaster, Ontario, and Gordon Alan Roeder and Paul Henry Heathcote Hookings, Burlington, Ontario, Canada, assignors to The Steel Company of Canada Limited, Hamilton, Ontario, Canada, and Metallgesellschaft A.G., Frankfurt am Main, Germany
Continuation-in-part of application Ser. No. 652,143, July 10, 1967, now Patent No. 3,472,649, which is a continuation-in-part of application Ser. No. 571,837, Aug. 11, 1966, now Patent No. 3,472,650. This application Oct. 14, 1969, Ser. No. 866,272
Int. Cl. C21c 5/52; H05b 1/00
U.S. Cl. 75—12
3 Claims

ABSTRACT OF THE DISCLOSURE

An efficient method of steelmaking in a direct arc furnace utilizing substantially continuous charging of discrete iron-bearing material into the arc flare regions at a controlled rate such that the particles of material fall into the molten metal bath without forming clusters of unmelted particles. Slag forming and alloy perfecting additions are made such that the desired carbon content and tap temperature are reached near the end of the continuous charging or during a shortened refining period after melting. A steady vigorous boil of the bath continues throughout the heat as a result of the excess carbon of the initial charge and the composition of the discrete material continuously charged.

CROSS REFERENCE TO RELATED APPLICATIONS

This application is a continuation-in-part of co-pending U.S. application Ser. No. 652,143, filed July 10, 1967, now U.S. Pat. No. 3,472,649, which application is a continuation-in-part of co-pending U.S. application Ser. No. 571,837, filed Aug. 11, 1966, now U.S. Pat. No. 3,472,650.

BACKGROUND OF THE INVENTION

This invention relates to series electric-arc steelmaking and is particularly directed to a method of substantially continuously charging iron-bearing material into an electric-arc steelmaking furnace.

Conventional electric arc steelmaking furnaces, Heroult direct-arc type, utilize scrap metal as melting stock which is top-charged or door-charged into the furnace. The charging of scrap materials into the furnace necessitates, in addition to the initial furnace charge, from one to as many as six scrap recharges in order to obtain the desired final metal charge weight in the furnace, the number of recharges required depending upon the size and shape of the scrap used. Prior to each recharging of the furnace with scrap, the power is shut off, the hot electrodes withdrawn and, in a modern top charged furnace, the roof lifted and swung to one side. The scrap charge is then placed in the furnace by means of a drop-bottom bucket or the like which is brought to the open furnace and held in position over it by an overhead crane. This method of charging scrap to the furnace heretofore has been considered to be the quickest and most efficient technique available. The time taken to complete a recharge of scrap varies, a charging time of from 4 to 7 minutes being normal for a modern steelmaking furnace. It is evident that elimination of these interruptions from the steelmaking sequence for recharging particularly when many recharges are required would result not only in shorter heat times but also in decreased energy consumption per ton of steel produced since the considerable heat lost from the furnace chamber by radiation when it is opened to receive a scrap charge must be subsequently recovered.

In electric-arc steelmaking furnaces, the electric current passes through one electrode, across the arc created between the foot of the electrode and the scrap or bath, then through the scrap or bath and up across another arc to an adjacent electrode, completing the circuity through this second electrode. The arcs constitute a variable resistance in the circuit which can be altered by raising or lowering the electrodes to change the arc length, the electrodes being moved up and down by automatic means which seek a predetermined position and therefore correct resistance to maintain the electric current and applied voltage at the value chosen by the furnace operator. Because the scrap tends to fall against the electrodes as the electrodes bore through the scrap charge, the arcs are frequently short-circuited, resulting during the meltdown period, in effect, in a series of short circuits, i.e. one or more of the three phases of the furnace transformer secondary circuit is short-circuited. Arc energy interruptions resulting from these short circuits normally are brief in duration being in the order of a few seconds. However, interruptions as long as 30 seconds sometimes occur if the electrode is short-circuited by scrap falling against it at a point some distance above the foot of the electrode necessitating the electrode to pull out of the bore cavity to a point above the touching scrap before effective power can be resumed. It is clear that elimination of these frequent power interruptions by stabilizing the arc during the meltdown period of steelmaking would result in employment of a higher average electrical energy input and realization of a shorter heat time.

Conventional electric-arc furnaces furnish most of the heat for melting scrap by means of a direct arc formed between each electrode and scrap material.

The electric-arc provides a very intense source of high temperature heat (6300° F. for the carbon arc). The heat is radiated from along the length of the arc and generated at the interfaces of arc/metal or slag, and arc/electrode. These locations of high temperature referred to herein as the "arc flare zones" normally occupy positions at the foot of each electrode flaring away from the edge opposite to the furnace center toward the wall of the furnace and arcing downwardly to the bath. The rate at which a given scrap charge will absorb the heat from the three arc flare zones is largely dependent upon the area of cold metal exposed to the radiation from these zones, the rate of heat transfer diminishing continuously as the average temperature of the scrap charge rises. It has always been a problem in the prior art that radiation from the arc, particularly radiation from these zones, is extremely damaging to the furnace; so much so in fact that in usual practice, after meltdown, the energy dissipated by the arc zone must be decreased in order to protect the refractory sidewalls and roof in line of sight of the arcs from overheating. It is clear that the presence of means or a method of protecting the furnace refractories would permit full power utilization at all times during steelmaking with resulting shortened heat time, i.e. the time to make one bath (heat) of steel.

The traditional steelmaking cycle consists of five operations: the "meltdown period" when the scrap is melted; "refining period" when the impurities of the molten steel bath are removed and alloying and deoxidizing additions are made; "tapping period" when the molten charge is removed from the furnace chamber; "fettling period" when the furnace bottom and banks are repaired in preparation for the next heat; and "charging period" when the scrap metal is placed in the furnace.

Of these operations, the refining period can be the most variable, the length of the refining period depending upon the composition of the metal bath on completion of the meltdown of the scrap. Because scrap is heterogeneous material of variable and often unknown chemical composition, having been collected from a multiplicity of sources, the composition of the metal bath at meltdown usually cannot be predicted with a reasonable degree of accuracy. For example, it is often found that the sulphur or phosphorus content of the metal at meltdown exceeds the amount specified for the finished steel. In such cases, a lengthy steelmaking procedure known as the two-slag practice may be necessary to lower the content of these elements. This practice consists of shutting off the power, raising the electrodes, back-tilting the furnace slightly, and then raking the slag off the metal pool through the charging door using a rabble. A second slag is then made by charging for example lime, powdered coke, fluorspar and sand to the furnace. This procedure can take from 20 to 60 minutes.

It is also usually found that the carbon content of the bath after meltdown is either too high or too low for the grade of steel specified. The carbon content is decreased in the refining period by making additions of iron ore or mill scale or by lancing the bath with gaseous oxygen. The carbon content is increased by making additions of coke, coal or graphite to the bath. Dipping the graphite electrodes in the bath is sometimes used although this is an expensive method of recarburizing the bath.

The temperature of the steel prior to tapping must fall within a narrow specified temperature range somewhat above the liquidus temperature of the steep, particularly if the molten steel is to be continuously cast. It is evident that shortening of this prolonged period of bath composition and temperature adjustment would constitute a very significant improvement in electric-arc steelmaking.

Discrete iron-bearing material called sponge iron has been used in the past for charging with scrap metal to an electric-arc steelmaking furnace. In most cases, these attempts provided poor results in that longer heat times and higher power consumptions were required. The reason for this is believed to be that the sponge iron particles in the charge tend to pack together very tightly, thus producing a relatively impermeable layer or layers which trap liquid iron formed in the region of contact between the scrap and the furnace electrodes. Iron thus trapped cools and solidifies in situ, welding the sponge iron particles together. The welded layer or mass formed prevents gravitation of the liquid iron to the furnace hearth. This barrier to the descent of molten metal and slag creates an adverse melting condition, i.e. melting of the charge from the top to bottom. In this situation, the arcs are exposed to the roof and to the upper courses of the side wall bricks with resultant damage to the affected refractories. Also, under this situation, the fused mass, which is difficult to melt, necessitates a prolonged melt-down period with attendant higher than normal energy consumption. It is evident that a method of eliminating the formation of impermeable sponge iron layers or masses would be important in permitting effective utilization of sponge iron in the electric-arc furnace.

In many direct reduction processing plants, a considerable portion of the sponge iron produced is finer than $3/16$ inch and, in some of these plants, the entire output is very much finer than this size. The very fine size tends to aggravate the formation of fused masses or clusters of sponge iron particles. To overcome this disadvantage, it has been conventional practice to cold or hot press the metallic fines into dense briquettes having a suitable size and shape. Briquettes give no problems in conventional melting practice. Although briquetting represents a solution to the problem of employing fines in steelmaking, it also represents additional cost both of capital to purchase a briquetting press and of operation to power, maintain and to man the press. A steelmaking procedure whereby metallic fines could be used directly in the furnace without a decrease in productivity and an increase in energy consumption is desirable in obviating these capital costs.

Many techniques have been devised and attempted over the years to improve the operation of electric-arc steelmaking furnaces including the charging of sponge iron into the furnace through holes provided in the furnace roof. Heretofore such techniques have not led to significant improvement in the steel-making operation and, therefore, such methods have not met with ready acceptance and commercial use. For example, German Pat. No. 954,699 issued Dec. 20, 1956, describes an apparatus for charging materials to an electric-arc steelmaking furnace, but does not give sufficient operating instructions to enable a steelmaker to carry out a process of regularly attaining optimum melting and refining conditions through the use of substantially continuous feeding of the iron-bearing feed. Nor does the patent teach the necessity for maintaining a steady carbon boil during continuous feeding nor the optimum location of feeding the iron-bearing material. For another example, U.S. Pat. No. 3,153,588, issued Oct. 20, 1964 teaches a technique for the feeding of sponge iron into an electric-arc steelmaking furnace. According to this patent, an essential part of the operation is that "the arc should be covered by sponge iron and, therefore, the arc submerged in the sponge iron." As mentioned previously, this practice leads to the formation of clusters which are difficult to melt and which result in a condition of continuous electrical shorting of the electrode. Accordingly, the teachings of these patents are contrary to the process of the present invention which is found economically operative as will be described and claimed hereinbelow.

SUMMARY OF INVENTION

We have found that these problems can be overcome by forming in a direct arc electric furnace a slag covered bath of molten metal having carbon substantially in excess of the desired carbon content at the completion of the refining operation and continuously feeding a discrete free-flowing, iron-bearing material having a composition within the range of from about 76 percent to 99.5 percent by weight total iron into said slag cover at a controlled rate such that no clusters of unmelted iron-bearing material are created and a steady carbon boil is produced; thus providing a steelmaking cycle essentially free of interruptions, optimum utilization of electrical energy, dimnished refractory damage due to radiation, and decreased charge to tap time due to the shortening of the refining period.

The discrete iron-bearing material used in the process of the invention has a composition within the range of from 76 percent to 99.5 percent by weight total iron and residual oxygen content of 0.1 percent to 1.75 percent, and up to 5.0 percent, by weight. Throughout the application, figures relating to oxygen refer to residual oxygen combined with iron.

The initial charge of the electric furnace may include in addition to the metal and iron-bearing material some of the necessary fluxing, carbon and alloying additives. It is not necessary or even preferable that the discrete particles be present in the initial charge and, accordingly, the charge may initially be made up with only scrap metal, carbon and fluxing additives.

After some of the scrap is melted and forms a slag covered pool, the discrete particles of iron-bearing material are substantially continuously fed into the slag layer to the pool. When continuous feeding starts, the particles are believed substantially to melt as they fall through this hot slag layer and they are fed at a rate which is slow enough to prevent formation of clusters of unmelted particles on the slag surface. As the charging continues, the molten metal temperature normally rises and the carbon content normally falls to the desired levels as will become evident as the description proceeds. The feed rate of the discrete iron-bearing particles is controlled at a rate which will achieve or hold the desired temperature of the metal bath while still sufficiently slow to prevent the formation of clusters of particles. During this time bath temperature can be determined and bath samples can be taken. After meltdown of the initial charge and during any operation up to the time of tapping decarburizer such as gaseous oxygen or particulated oxide can be injected, or, if needed, a carburizer such as carbon can be injected according to normal steelmaking practices.

At the same time, of course, slag-forming ingredients can be added to maintain an average basicity ratio, i.e. ratio of "bases" to "acids" which, for example, can be a relatively neutral ratio of calcium oxide and magnesium oxide to silicon dioxide and aluminum oxide of about 1 or 1.5.

If no phosphorus elimination or manganese or carbon correction, for example, is required, the temperature at the end of the addition of the discrete iron-bearing material should approximate tap temperature. On the other hand, if carbon or manganese is to be added to the steel, then the feed of discrete iron-bearing particles may be completed at a lower temperature and the carbon or manganese added to the bath while maintaining the power input.

Agitation of the bath also is believed important to enhance the efficiency of heat exchange between arc and bath and the refining during melting. This agitation can result from the chemical reaction between carbon and oxygen. A movement of bath and slag also results from impact of the arc.

The term "steelmaking" where used herein is intended to include making an iron carbon alloy, where the carbon is in the approximate range of from 0.02 percent to 1.8 percent by weight and all of the other constituents are in a refined state.

It is, therefore, an important object of the present invention to overcome the aforementioned problems and disadvantages inherent in prior art processes and, in particular, to shorten the steelmaking time and lower the total energy consumption.

It is another object of the invention to eliminate frequent power interruptions by stabilizing the arc during the meltdown period of steelmaking and thus provide a high average electrical energy input and shortened steelmaking time.

Still another important object of the present invention is the provision of a simultaneous melting and refining by oxidation method of steelmaking to provide a steel within the desired ranges of metallurgical composition and tap temperature which effectively shortens the conventional refining period in the steelmaking cycle.

And another important object of the invention is to continuously charge discrete iron-bearing material at a rate which prevents the formation of particle clusters and permits ready assimilation of the said iron-bearing material in the molten metal bath.

It is a further important object of the present invention to utilize discrete particles of iron-bearing material such as sponge iron having a known composition within the approximate range of 76 percent to 99.5 percent by weight total iron having a residual oxygen content of from 0.1 percent to 5.0 percent together with scrap iron and/or scrap steel, if desired, for the production of steel of predetermined composition.

And a still further important object of the present invention is to provide an agitation action to the molten metal bath for an accelerated refining rate.

BRIEF DESCRIPTION OF THE DRAWINGS

These and other objects of the invention, and the manner in which they can be attained, will become apparent from the following detailed description of the method and apparatus with reference to the accompanying drawings, in which:

FIG. 2b is a graphical illustration of power input relative to heat time for conventional electric steelmaking practice utilizing scrap material showing meltdown and refining periods;

Like reference characters refer to like parts throughout the description of the drawings.

DESCRIPTION OF THE ILLUSTRATED EMBODIMENT

Figure 1:
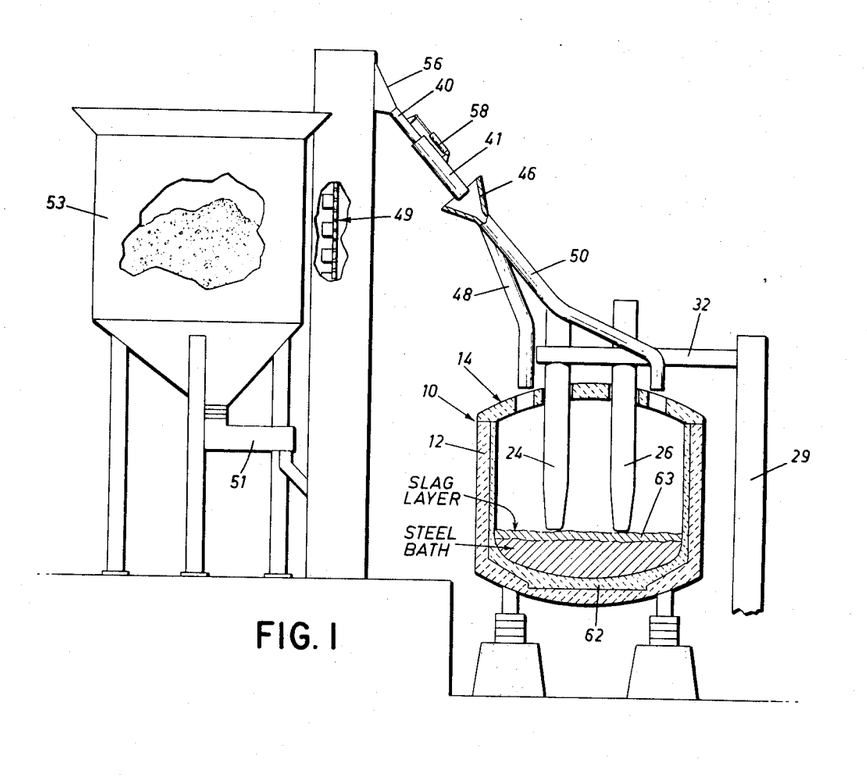
FIG. 1 is a schematic elevational view, in part, of the furnace showing the charging system for continuous feeding of sponge iron to an open bath.

With particular reference to FIG. 1, an embodiment of the structure of the present invention will now be described wherein furnace 10 has cylindrical side wall 12 with removable roof 14. Electrodes 24 and 26 are two of three electrodes in the furnace each of which are mounted on a mast such as member 31 and by means of an arm such as 32 for independently raising and lowering each of said electrodes through openings formed in roof 14 equispaced about the roof center. Mast 29, in turn, is supported by platform not shown having rollers for pivoting about its axis, thereby moving roof 14 and the electrodes to one side or furnace 10 for loading with charge materials.

Three conduits, such as conduit 40, each have a telescopic extension 41 retractable from and extensible into a sleeve such as 46 formed in stationary ducts such as 48 and 50. These are in communication with openings formed in the furnace roof 14 at points between the electrodes and furnace side wall 12. Said conduits, slope at an angle such that the material flows freely into the furnace. The ducts are in communication at their upper extremeties with a conventional splitter box 56 having gating means for independently regulating the flow of material to each conduit. Mechanical, or pneumatic or hydraulic piston-cylinder units 58 permit the extension and retraction of conduit extensions 41 to and from their respective sleeve 46 engaging positions. Bucket elevator 49 which receives sponge iron at a controlled rate from weigh feeder 51 in communication with hopper 53 continuously feeds splitter box 56.

In operation, roof 14 and the electrodes are lifted and swung away from the furnace 10 for charging the furnace, and then returned to their respective operative positions.

The electrodes are lowered through their roof openings into proximity to the scrap contained in the furnace and a predetermined voltage applied to each electrode creating an arc which bridges the space between the electrodes and scrap thereby heating and melting the scrap in proximity to the arc. As the scrap melts and falls away from the electrodes, an electrical control system causes the electrodes to be repositioned vertically an optimum distance from the scrap for maintenance or re-ignition of the arc, as necessary, and for maximum production of heat. The electrodes thus independently bore through the scrap melting the scrap in proximity thereto to form an open bath 63.

The sponge iron charge can be initiated at this stage, preferably into an area of the bath in proximity to and surrounding the arc flare zones by means of the conduits.

The rate of continuous charging of the sponge iron to the furnace through the slag can be balanced with the power input and heat produced thereby to prevent clusters of unmelted particles from forming on the slag surface and to attain the desired carbon, alloying element content and tap temperature. For example, we have found that at a power input of 7.4 megawatts to a 25 ton furnace, a sponge iron pellet feed rate of 700 pounds per minute, resulted in a 6° F. per minute fall in bath temperature, and a feed rate of 500 pounds per minute, resulted in a 7.5° F. per minute rise in bath temperature.

Typically, the slag analysis could be represented by the following range and example of a heat with slag within the range:

|  | Percent by weight | |
|---|---|---|
|  | Range | Typical slag example at meltdown |
| $SiO_2$ | 2.0–40.0 | 32.84 |
| $Al_2O_3$ | 0.0–20.0 | 6.28 |
| CaO | 1.0–50.0 | 17.40 |
| MgO | 0.0–25.0 | 23.84 |
| $P_2O_5$ | 0.0–2.0 | 0.09 |
| FeO | 3.0–40.0 | 14.64 |
| Other | | 4.91 |

The slag basicity ratio of typical heats is neutral. The basicity of the typical heat example given above was 1.08, i.e. the weight ratio of $$\frac{CaO + MgO}{SiO_2 + Al_2O_3}$$

was 1.08.

Surprisingly effective results have been attained by the methods of the invention as will be evident from the following general description and examples given hereinbelow carried out in two, three-phase electric arc steelmaking furnaces with nominal rated capacities of 15 and 25 tons, identified as furnace A and furnace B respectively and powered by 8000 kva. transformers.

In general, according to the method of the invention, the furnace may be initially charged with sponge iron and steel scrap. Typical chemical compositions, by weight, of sponge iron pellets of the type disclosed are as follows:

| | Chemical analyses of sponge iron pellets by percent weight | | | | | | |
|---|---|---|---|---|---|---|---|
| | A | B | C | D | E | F | G |
| Total Fe | 92.80 | 87.70 | 78.70 | 90.85 | 97.09 | 94.59 | 89.3 |
| Metallic Fe | 89.94 | 82.54 | 72.73 | 90.20 | 94.11 | 91.35 | 83.2 |
| Iron oxide | 3.68 | 5.17 | 7.68 | | 3.83 | 3.24 | 7.86 |
| Oxygen in iron oxide | 0.82 | 1.15 | 1.71 | 0.10 | 0.85 | 0.72 | 1.75 |
| Carbon | 0.098 | 0.409 | 0.125 | 0.15 | 0.194 | 0.42 | 0.19 |
| Gangue: | | | | | | | |
| Sulphur | 0.008 | 0.051 | 0.014 | 0.008 | 0.029 | 0.010 | 0.042 |
| Phorphorous | | | | 0.046 | | | |
| Titania | | | 10.09 | | | | |
| Lime | 0.32 | 1.35 | 0.7 | 0.60 | 0.20 | 0.76 | 0.20 |
| Magnesia | 1.47 | 2.52 | 0.7 | 2.40 | 0.58 | 0.64 | 0.66 |
| Silicia | 3.88 | 4.84 | 1.2 | 2.04 | 0.50 | 1.86 | 3.88 |
| Alumina | 0.60 | 1.87 | 5.4 | 0.96 | 0.56 | 1.00 | 0.17 |
| Other gangue | | 0.10 | 0.5 | | | | 4.60 |
| Percent metalization | 96.9 | 94.1 | 92.4 | 99.28 | 97.0 | 96.6 | 93.2 |

NOTE.—Percent metallic Fe over percent total iron times 100 equals percent metallization.

The scrap used consists of about 65 percent mixed, unprepared material and about 35 percent heavy melt material.

Carbon usually in the form of petroleum coke (due to its availability and low cost) is also added to the initial charge to provide carbon for the boil throughout the heat and to ensure sufficient carbon in the bath at the end of the heat.

This initial charge is partially melted using a circuit power in the furnace system of 7 to about 8 megawatts. When meltdown has been reached, controlled continuous pellet feeding is started. The initial feed rate in the various heats ranges from 300 to 500 pounds per minute. As the heat progresses, the feed rate is varied, as required, in order that the pellets will substantially melt as they fall through the slag. If mounds of pellets, i.e. sponge iron covers, start to accumulate, the feed rate is slightly reduced in order to cear the mounds and regain the bath temperature.

The pellet feed is completed at this level of power input with variations in the feed rate being dependent upon the bath temperature, which is checked periodically with an immersion thermocouple, to reach a bath temperature near the tapping range for continuous casting of about 2950° to 3000° F. at the same time as pellet feeding is completed.

During the heat, metal bath samples are taken in order to follow the carbon drop of the melt. This is done to have the bath carbon within the desired range at the completion of melting. A final bath sample is taken after the pellet feed is completed and further refining, if any, is done as required.

In the ideal situation, no conventional refining period is required and the heats are thus able to be tapped as soon as the chemistry of the final sample is known. Because not sulphur or phosphorus problems generally are encountered with the iron-bearing materials used, it is possible to make the heats with little or no lime or limestone additions to the meltdown slag and without a second slag.

Steels were made to the following specifications, with the intermediate 32 and 28 reinforcing bar grades predominating:

| Grade of steel | Range in percentages by weight of steel | | | | |
|---|---|---|---|---|---|
| | C | Si | Mn | S (max.) | P (max.) |
| Intermediate 32 | .30/.34 | .15/.30 | .45/.65 | 0.50 | .050 |
| Intermediate 28 | .28/.32 | .15/.30 | .45/.65 | 0.50 | .050 |
| A 36 (ASTM grade) | .12/.17 | .15/.30 | .50/.75 | 0.45 | .040 |

EXAMPLE 1

An initial charge consisting of 6000 pounds of scrap and 12,400 pounds of sponge iron pellets of the composition described above as type A together with 400 pounds of petroleum coke was charged to the 15 ton A furnace. The electrodes were lowered and power applied for 24 minutes which resulted in the formation of a pool of molten metal therein. Sponge iron pellets, essentially spherical in shape and having a size range of minus ⅝ to plus 3⁄16 inch, were then introduced through three conduits at locations near the arc flare zones at an average rate, when charging, of 400 pounds per minute until a total of 14,000 pounds of pellets from continuous charging was in the furnace to make a total pellet charge of 26,400 pounds or 81.5 percent of the metallic charge. Table I illustrates the time required for the steps of continuous charging, melting and refining the scrap, coke and sponge iron pellets.

TABLE I

Operating step:                  Time elapsed—minutes
    Power on ________________________________ 0
    Initiation of controlled pellet charging _________ 24
    All pellets charged _______________________ 69
    Tap ____________________________________ 84

Energy consumed was approximately 580 kwh./ton of steel tapped. A comparable heat time for melting and refining an all-scrap charge in the same furnace, according to conventional practice, was 161 minutes with an energy consumption of about 640 kwh./ton of steel tapped. The difference in power on the tap time represents a decrease time of 47.8 percent in favor of the heat made with sponge iron pellets.

EXAMPLE 2

This example illustrates the operation of the invention wherein sponge iron chips, i.e. minus 3⁄16 inch material having the composition described above as type B, were fed continuously into the 25 ton B electric-arc furnace. An initial charge consisting of 10,000 pounds of steel scrap and 20,400 pounds of sponge iron chips and 430 pounds of petroleum coke was placed in the furnace. The electrodes were lowered and power applied 32 minutes for the formation of a pool of molten metal before sponge iron chips were introduced with the continuous charging apparatus at an average rate of 500 pounds per minute until a total of 25,000 pounds of sponge iron from continuous charging was in the furnace to make a total sponge iron charge of 45,000 pounds or 82 percent of the metallic charge. Table II illustrates the time required for the steps of charging, melting and refining the scrap, coke and sponge iron.

TABLE II

| Operating step: | Time elapsed—minutes |
|---|---|
| Power on | 0 |
| Initiation of controlled chip charging | 32 |
| All chips charged | 99 |
| Tap | 138 |

Energy consumed was approximately 560 kwh./ton of steel tapped. The production rate was 10.6 tons of steel produced per hour. Comparable energy consumption and productivity for melting and refining an all-scrap charge on the same B furnace according to conventional practice was 580 kwh./ton of steel tapped and 8.3 tons of steel produced per hour respectively. The productivity of the furnace was increased by about 28 percent, through the use of controlled, continuous feeding of sponge iron chips. Productivity is defined as the production per unit of total furnace time.

EXAMPLE 3

This sample illustrates the operation of the method of the invention wherein sponge iron to type C with high $TiO_2$ content and scrap of the type stated in Example 1 were fed to an open bath in the furnace. An initial 13,700 pound charge of scrap, 4,900 pound charge of the pellets and 400 pound charge of coke was placed in the furnace. The electrodes were lowered and power applied for 26 minutes until the formation of the trefoil-shaped bath before sponge iron pellets were introduced through three conduits at locations near the arc flare zones at an average rate of 420 pounds per minute until a total of 19,000 pounds of pellets from continuous charging were in the furnace to make a total pellet charge of 23,900 pounds equivalent to 63.5 percent of the metallic charge. Table III illustrates the time required for the steps of charging, melting and refining the scrap, pig iron and sponge iron pellets.

TABLE III

| Operating step: | Time—minutes |
|---|---|
| Power to electrodes | 0 |
| Initiation of pellet charge | 26 |
| All pellets charged | 71 |
| Tap | 95 |

Energy consumed was approximately 712 kwh./ton of steel tapped. This is a very reasonable power consumption considering that this material contained a high gangue content, i.e. 19.5 percent, and a combined oxygen content of 1.71 percent.

A comparable heat time for melting and refining a similar type or scrap, as used in Example 3, according to conventional practice, was 171 minutes with an energy consumption of 652 kwh./ton of product. There exists a widespread opinion that titania-bearing materials are not amenable to steelmaking processing. However, we found that satisfactory slags could be produced according to the method of the present invention with optimum melting and refining of the sponge iron fed thereto at a reasonable energy consumption rate.

In the three foregoing examples a vigorous, steady boiling action took place in the bath throughout pellet feeding. This boiling action significantly improved heat transfer and permitted the sponge iron pellets to be readily engulfed by slag, thereby increasing their rate of acceptance by the bath without the undesirable formation of floating mounds or clusters of unmelted material and enhancing refining during melting of the material.

EXAMPLE 4

This example illustrates the operation of the method of the present invention at the lower residual oxygen content level of 0.1 percent wherein sponge iron having the analysis of type D in the above table was fed into the B furnace. The initial charge consisted of 8,000 pounds of scrap, 200 pounds of coke and 12,935 pounds of pellets.

The electrode were lowered and power applied for 27 minutes before starting to feed pellets into the arc flare zones. After the pellets were fed for a few minutes at a rate expected from previous tests to give the desired results, i.e. 450 pounds per minute, it was observed that the pellets tended to accumulate in mounds and the rate of pellet addition had to be decreased to 330 pounds per minute to balance the rate of feeding with the rate of melting of the pellets. With these highly metallized pellets no boil occurred in the bath and the melting of the pellets in the slag was retarded. The "no boil" condition of the bath and pellet build-ups near the banks caused irregular eddy currents to be created in the bath. These, in turn, produced waves on the surface of the bath, causing the arcs to alternately extinguish and re-ignite frequently. The overall energy input was, therefore lower than normal, making it necessary to further lower the rate of pellet feeding to obtain the correct temperature rise. The heat time, 177 minutes, and power consumption, 635 kwh./ton of steel tapped, were comparable with that obtained in conventional practice.

Agitation of a bath into which highly metallized pellets are fed can be increased by feeding iron oxide, such as millscale or fine iron ore, simultaneously with the pellets, to make up the deficiency in combined oxygen in the highly metallized sponge iron pellets. An alternative would be to use lance oxygen either before or after the melting is completed.

EXAMPLE 5

This example illustrates the operation of the present invention wherein sponge iron having the analysis of type E from the above table was fed into the B furnace. This sponge was in a granular form with 97 percent passing through a 10 mesh screen, i.e. having a particle size of minus $\frac{1}{16}$ inch.

The initial charge consisted of 5,800 pounds of scrap, 8,500 pounds of pig iron and 11,100 pounds of sponge. Power was applied for 47 minutes and continuous feeding was initiated. Granular sponge was fed to the furnace at an average rate of 438 pounds per minute. During the feed periods, the slag tended to foam and rise to envelop completely the arcs. The foaming condition, probably due to iron oxide reduction within the slag layer, produced the desirable results of effectively insulating the arcs and thereby eliminating refractory burning.

Thus we have solved the prior art problems of damage to the lining from radiation and heat loss through radiation by merely producing a foamy slag which, as previously described, can be effectively obtained by chemically reducing the iron oxide in the slag layer. The foam then permits higher power application and, accordingly, it is possible to run on high power throughout almost the entire heat.

Table V illustrates the time required for the steps of charging, melting and refining the scrap, coke and sponge iron.

TABLE V

| Operating step: | Time elapsed—minutes |
|---|---|
| Power on | 0 |
| Initiation of controlled sponge charging | 47 |
| All sponge charged | 111 |
| Tap | 139 |

The energy consumed was approximately 540 kwh./ton of steel tapped, which was considerably below the average energy requirement of 570 kwh./ton for all-scrap heats made in the same 25 ton furnace. The lower energy consumption in the heat made with the granular sponge was due to the foamy slag which led to decreased heat losses from the metal bath. Steel productivity in the heat was 11.4 tons/hour or about 38 percent greater than the productivity of the average all-scrap heat of 8.3 tons/hour made in the same furnace.

A foamy slag about one foot thick was generated in each location of the continuous sponge feed effectively burying the electric arc to prevent refractory burning and improved heat transfer to the system. The melting rates with foamy slags induced by the continuous feed of fine sized sponge iron was about equal to the melting rates obtained by the feed of pellets but the energy consumption was enhanced. A series of trial runs indicated an energy consumption of 539 kwh./ton tapped, corrected to 525 kwh./ton, can be obtained with the controlled continuous feed of fine sized sponge iron.

EXAMPLE 6

An initial charge of 13,500 pounds of scrap, 4700 pounds of pig iron and 13,800 pounds of sponge iron pellets of the composition described above as type F was charged to B furnace. The electrodes were lowered and power applied for 53 minutes for formation of a bath of molten metal before a mixture of sponge iron pellets and chips of type F was introduced in the manner described above at an average rate of 383 pounds per minute until a total 23,000 pounds of pellets and chips from continuous charging was introduced to make a total sponge iron charge of 36,800 pounds or 69 percent of the metallic yield of 52,000 pounds. The sponge iron constituted 70 percent pellets within the size range of minus ⅝ inch plus 3⁄16 inch and 30 percent chips having a particle size smaller than 3⁄16 inch. Table VI illustrates the time required for the steps of charging, melting and refining the scrap, pig iron and sponge iron pellets and chips.

TABLE VI

| Operating steps: | Time—minutes |
|---|---|
| Power to electrodes | 0 |
| Initiation of pellet charge | 53 |
| All pellets charged | 108 |
| Tap | 150 |

Energy consumption was approximately 555 kwh./ton of steel tapped at a power input of 7.1 megawatts; productivity being 10.4 tons/hour for an improvement in productivity of about 25.4 percent relative to a comparable all-scrap heat of 8.3 tons/hour.

If an inexpensive and plentiful supply of suitable scrap material is readily available, it may be preferred to use a minimum of sponge iron and as much scrap as practicable by the normally undesirable batch charging of the scrap; the continuous fed sponge iron being introduced to obtain the important advantage of minimizing the refining period as described in the foregoing disclosure. Therefore, although the process of the present invention has proceeded with reference to the introduction of discrete particles of iron-bearing materials in the form of sponge iron to electric-arc furnaces in amounts of, for example, 63.5 percent, 82 percent and as much as about 100 percent by weight of the total charge. It will be understood that the process can be carried out with a total continuously charged sponge iron content as low as about 15 percent of the total charge which in ideal practice is sufficient to substantially eliminate the conventional refining period. The following example illustrates the operation of the process of the invention with continuous charging of sponge iron in the amount of about 20 percent after batch charging of scrap material.

EXAMPLE 7

In a test heat in B furnace, four buckets of scrap were charged to the furnace, as if a normal all-scrap heat were being made. The scrap charge weighed 43,900 pounds, of which 3500 pounds were pig iron. One thousand pounds of limestone was also charged. No sponge iron was included in these charges.

Power was applied for 86 minutes, including the time taken for the recharging, after which a molten bath with a temperature of 2870° F. was produced. Pellets having the analysis of type A were fed to the furnace at an average rate of 490 pounds per minute. The total weight of pellets continuously charged was 11,000 pounds. After several minutes, during which the temperature was corrected, the heat was tapped.

Table VII illustrates the time required for the charging, melting and refining of the heat.

TABLE VII

| Operating step: | Time elapsed—minutes |
|---|---|
| Power on | 0 |
| Initiation of continuous charging | 86 |
| All sponge charged | 109 |
| Tap | 117 |

The energy consumed in the heat was approximately 495 kwh./ton of steel tapped, well below the average energy requirement of 570 kwh./ton for all-scrap heats made in the same furnace. The energy consumed in the heat was somewhat less than in the other examples cited because less gangue was melted due to the low percentage of pellets charged.

In heats made with low percentages of sponge iron, or of sponge iron having low residual oxygen contents, carbon correction and/or bath agitation can be achieved through the use of oxygen lancing. Some uncertainty with respect to carbon levels is inherent in the low percentage sponge practice because only a small portion of the sponge, with its known chemical composition, is used, and a reduction of carbon content may be necessary. Also, sponge iron having low residual oxygen contents provide a flat bath and bath agitation, if desirable, may be effected by adding oxygen for reaction with carbon. The oxygen lancing may be carried out while the sponge iron is being charged so that the additional heat generated by the oxygen reacting with the bath carbon can be compensated for by an increase in the sponge iron feed rate. The use of oxygen, therefore, leads to shortened heat times and to further reduced electrical energy requirements. Likewise, carbon additions can be made at intervals or continuously during the continuous charging of iron-bearing material to correct the carbon content of the bath if the carbon content should be too low. The foregoing is not intended to restrict the use of any conventional carbon or alloy adjusting techniques, such as lancing after the charging and melting is complete.

The use of about 15 percent by weight of the charge, of descrete particles or iron-bearing material, while not overcoming some problems incurred in the bath charging of scrap material as described hereinbefore, provides the important advantage of substantially minimizing the refining period which normally takes place after the melt-down of the charge. Although, the addition of as little as 15 percent discrete material such as sponge iron necessitates close control of carbon content, due to the uncertainty of composition of the scrap material, carbon control maintained by oxygen lancing provides exothermic heat which permits an increase in the rate of sponge iron addition and acceleration of the substantially concurrent melting and refining operations.

The examples described hereinabove showing the reduced energy consumptions attainable with the present invention were conducted in 15 and 25 ton furnaces, A and B, respectively. It will be evident that improved energy consumption not much in excess of 350 kwh./ton of product for cold charges and not much in excess of 250 kwh./ton of product with the use of hot metal or the preheating of the charge constituents may be attained with furnaces of increased capacity as compared with somewhat in excess of 400 kwh./ton for all scrap charges. For example, iron-bearing materials such as sponge iron in the form of pellets introduced into the furnace can be heated in a neutral atmosphere to a temperature below the melting point of the pellets prior to charging to accelerate melting of the charge within the furnace In geographic areas where the quality of scrap is poor, or is not readily available for use in electric-arc steelmaking, it may be preferable to retain a portion of a preceding heat in the furnace to provide a molten bath into which the continuously fed sponge iron can be charged. The molten material comprising the heat can be recarburized by the addition of a carbon-containing material such as petroleum coke to provide a hot metal into which the sponge iron is continuously charged.

The present invention provides a number of important improvements in electric-arc steelmaking. By charging the furnace only once in the conventional manner, and by feeding the remainder of the metallic charge as sponge iron pellets from above into the area of the arc flare zones, a significant reduction in heat time is realized such that productivity of the furnace can be increased by more than 25 percent with, in some tests, increases of up to 60 percent being achieved.

Figure 2:
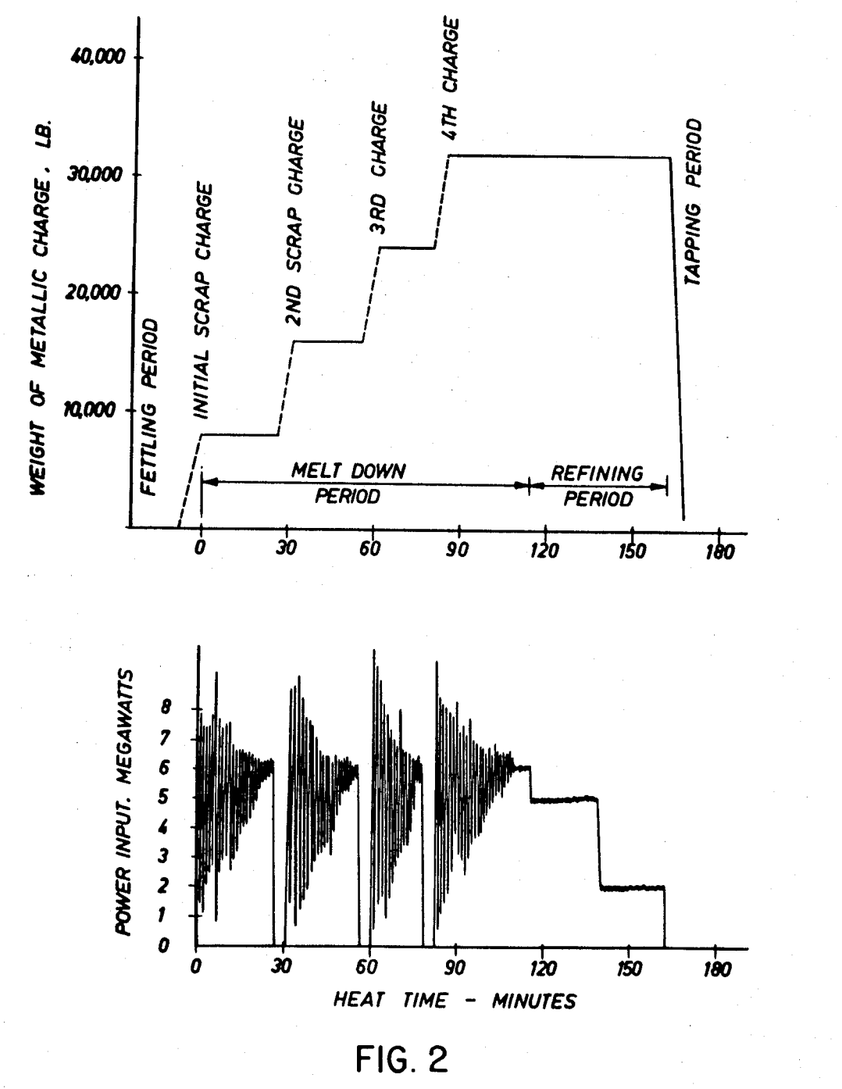
FIG. 2 is a graphical illustration of charge weight relative to heat time for conventional electric steelmaking practice utilizing scrap material showing meltdown and refining periods.
Figure 3:
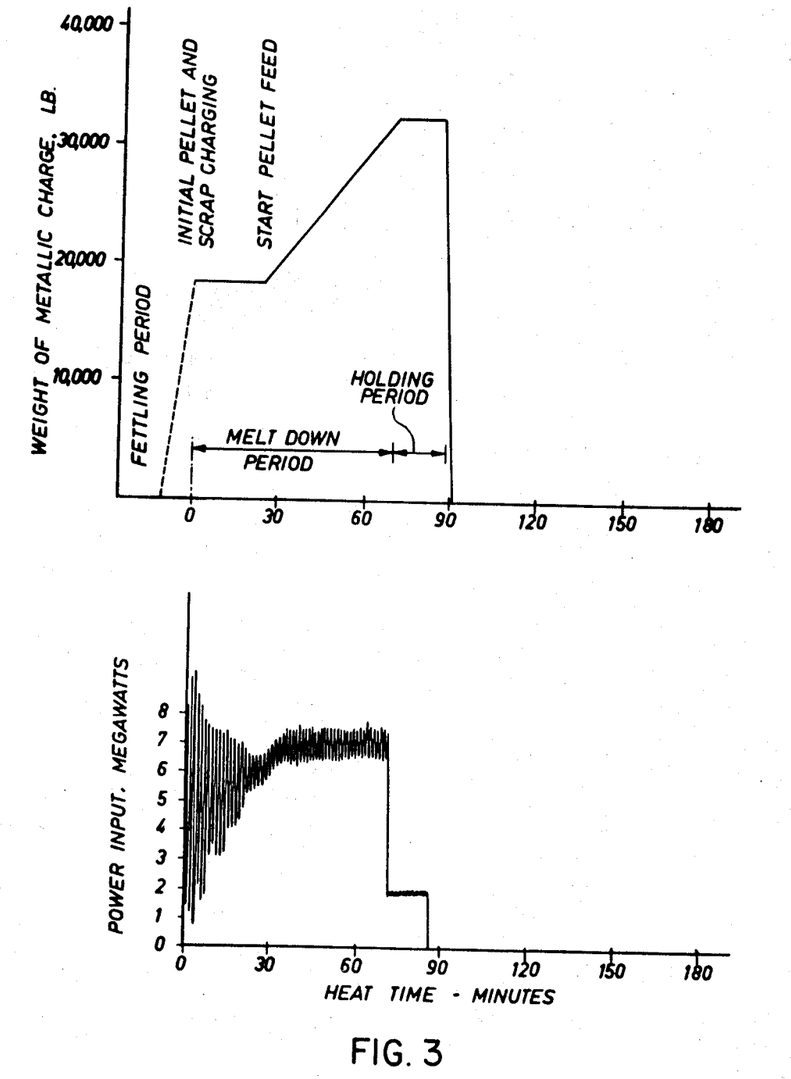
FIG. 3a is a graphical illustration of charge weight relative to heat time for the method of the invention utilizing controlled continuous charging of sponge iron pellets showing meltdown and holding periods.
FIG. 3b is a graphical illustration of power input relative to heat time for the method of the invention utilizing controlled continuous charging of sponge iron pellets showing meltdown and holding periods.
Figure 4:
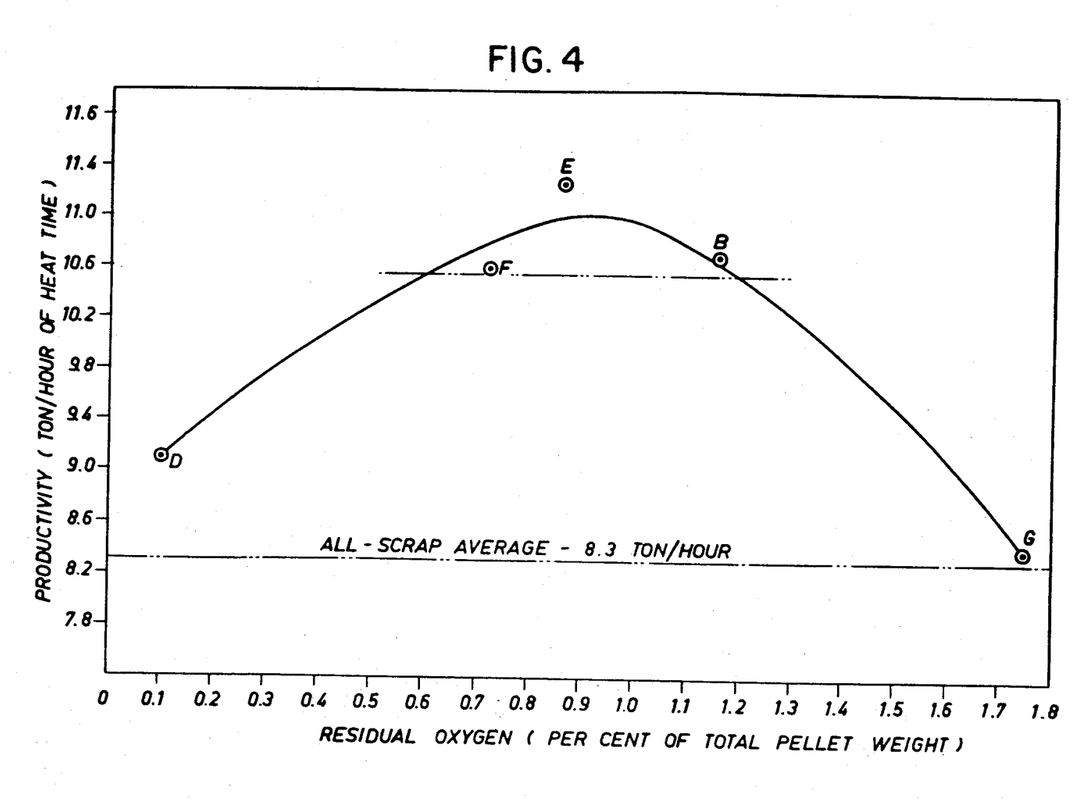
FIG. 4 is a graphical illustration of the effect of residual oxygen on furnace productivity.

The increase in productivity made possible by the controlled continuous charging method of the present invention, as illustrated in FIG. 4 wherein productivities of the several iron-bearing materials treated in furnace B, namely types B, D, E, F and G are illustrated relative to their respective residual oxygen contents and compared with conventional treatment of scrap, may be understood with reference to the schematic graphs shown in FIGS. 2 and 3 from which it will be evident that the use of the present invention for feeding sponge iron at a controlled, continuous rate during meltdown eliminates the need for making recharges of scrap to attain the desired final weight of metal. By this practice the loss in operating time which accrues during each recharge and also the loss of heat energy from the furnace when the roof is removed are avoided. The elimination of recharges is an improvement in electric-arc steelmaking, the rewards being shorter processing time with lower electrical energy consumption.

An advantage of these improvements in electric-arc steelmaking is that with a higher and more uniform power input to the furnace, as indicated by a comparison of FIGS. 2 and 3, the time required to melt the charge is shortened and the amount of circuit breaker maintenance is decreased. A further advantage of smaller surges in power may be realized in those furnace locations where the electrical power companies object to the severe swings in demand and insist upon additional reactance in the primary circuit to dampen these swings. In such localities the use of controlled, continuous sponge iron pellet feeding obviates such limitations to furnace power input.

Another important improvement in electric-arc steelmaking realized in using the present invention is the shortening or under ideal conditions the virtual elimination of the separate refining period. As seen in the graph in FIG. 3 and evident from the foregoing tablets, a holding or refining period from the completion of the feeding of the sponge pellets to the tapping of the refined steel has been indicated. This period reflects the time necessary for chemical analysis of the bath to determine its readiness for tap and any chemical adjustments. In the examples, productivity figures include total time with inclusion of the adjustment period. The normal high purity of sponge iron pellets allows, as soon as all of the charge is melted, the production of steel having a sulphur and pohsphorus content below the specified percentages for commercial steel grades. The controlled, continuous feeding of sponge iron pellets containing from 0.1 to 5.0 percent, by weight, residual oxygen combined with iron, also allows the formation of a steady, active boil which removes carbon from the bath at a predictable and controllable rate so that at meltdown the bath of steel ideally contains the desired or substantially desired carbon content.

In many areas where electric-arc furnace steelmaking shops are located, the quality of the scrap that is available is very poor, i.e. the scrap has an unknown and highly variable composition. In these areas, it is particularly desirable to have, in addition to the scrap as melting stock, sponge iron having a known composition with a low tramp element content.

It will be understood that although the description of the methods of the present invention has proceeded with reference to "sponge iron," this term is intended to encompass discrete free-flowing iron-bearing materials in general, briquettes, granules, punchings, borings and fragmentized scrap which have a composition within the range of from 76 percent to 99.5 percent by weight total iron and residual oxygen with iron content of 0.1 percent and as high as 5.0 percent, by weight.

Alloying and fluxing materials such as ferromanganese, ferrosilicon, lime and the like addition to that used in the initial charge can be added to the molten metal for refining of the metal within the furnace either before or after the controlled continuous charging is complete. The furnace can be adapted to discharge refined molten metal continuously to a casting unit wherein the quantity of metal tapped would be brought into phase with the quantity of iron-bearing material charged to the furnace.

The apparatus of the present invention can be arranged in conjunction with a rotary kiln for receiving hot sponge iron, carburized, if desired, directly from said kiln.

The present invention may also be used in the manufacture of gray cast iron and the like by recarburizing the bath after meltdown.

It will be understood, of course, that modifications can be made in the preferred embodiments of the invention described and illustrated herein without departing from the scope and purview of the appended claims.

The invention claimed is:

1. An electric furnace method of making steel having carbon in the approximate range of from 0.02 percent to 1.8 percent by weight and the other constituents in a refined state characterized by the efficient use of power by charging at a controlled rate such that unmelted clusters of iron-bearing material are substantially avoided in the bath, which comprises:

charging carbon-bearing and iron-bearing material into an electric-arc furnace;

melting said iron-bearing material to form a bath of slag and molten metal having carbon substantially in excess of the desirde carbon content of the metal at the completion of the refining operation;

substantially continuously charging a discrete, carbon containing, iron-bearing material having a composition within the range of from about 76 percent to about 99.5 percent by weight total iron with a residual oxygen content of from about 0.1 percent to about 5.0 percent by weight into said bath at a controlled rate, such that the forming of clusters of unmelted iron-bearing material is substantially avoided, a vigorous steady boiling action is created and the power consumption upon complete refining is less than 700 kwh. per ton.

2. An electric furnace method of steel-making characterized by the efficient use of power by charging at a controlled rate such that unmelted clusters of iron-bearing material are substantially avoided in the bath, comprising:

initially charging an electric-arc furnace having three electrodes with scrap metal, fluxing, carbon and alloying additives;

positioning the electrodes in proximity to said charge;

applying power to said electrodes to direct arcs from said electrodes to said charge to form a pool of molten metal with a slag cover thereon;

substantially continuously feeding discrete particles of iron-bearing material having a composition within the range of from about 76 percent to about 99.5 percent by weight total iron having a residual oxygen combined with iron content of from about 0.1 percent to about 5.0 percent by weight into said pool to create a vigorous steady boiling action while simultaneously and continuously applying power to melt and to refine said charge until up to as much as about 80 percent of the total metal charged is from said discrete particles and said entire charge is melted;

completing the refining operation to produce a steel having a carbon content of from about 0.02 percent to about 1.8 percent by weight; and tapping the refined steel from the furnace.

3. An electric furnace method of steel-making characterized by the efficient use of power by controlled charging, such that unmelted clusters of iron bearing material are substantially avoided in the bath, comprising:

initially charging an electric-arc furnace having three electrodes;

positioning the electrodes in proximity to said charge;

applying power to said electrodes to direct arcs from said electrodes to said charge;

continuously feeding discrete particles of iron-bearing material having a composition within the range of from about 76 percent to about 99.5 percent by weight total iron having a residual oxygen combined with iron content of from about 0.1 percent to about 5.0 percent by weight in proximity to arc flare locations while simultaneously and substantially continuously applying power to melt and to initially refine said charge until up to as much as about 80 percent of the total melt is from said discrete particles and said entire charge is melted;

completing the refining; and tapping the refined steel from the furnace while the total energy consumption is less than about 700 kwh. per ton of iron-bearing material and said steel has a carbon content of from about 0.02 percent to about 1.8 percent by weight.

References Cited

UNITED STATES PATENTS

| | | | |
|---|---|---|---|
| 2,205,043 | 6/1940 | Mican | 75—56 |
| 1,527,088 | 2/1925 | Shackelford | 75—11 |
| 2,502,259 | 3/1950 | Hulme | 75—12 |
| 2,747,985 | 5/1956 | Stefano | 75—11 |
| 2,983,598 | 5/1961 | Wheatley | 75—56 |
| 3,150,961 | 9/1964 | Collin | 75—11 |
| 3,188,197 | 6/1965 | Ostberg | 75—12 |

WINSTON A. DOUGLAS, Primary Examiner

P. D. ROSENBERG, Assistant Examiner

U.S. Cl. X.R.

13—33